United States Patent [19]
Kim

[11] Patent Number: 6,014,616
[45] Date of Patent: Jan. 11, 2000

[54] METHOD FOR MONITORING THE LANGUAGE USED FOR CHARACTER GENERATION BY AN OPERATING SYSTEM

[75] Inventor: Hyun-Don Kim, Kyungki-do, Rep. of Korea

[73] Assignee: SamSung Electronics Co., Ltd., Kyunggi-do, Rep. of Korea

[21] Appl. No.: 08/969,617

[22] Filed: Nov. 13, 1997

[30] Foreign Application Priority Data

Nov. 13, 1996 [KR] Rep. of Korea ........................ 96-53774

[51] Int. Cl.⁷ .............................. G06F 17/21; G06F 17/28
[52] U.S. Cl. ................................... 704/8; 704/1; 707/535; 707/536; 345/171; 345/150
[58] Field of Search ................... 704/1, 8, 2, 3; 707/536, 535, 530, 531; 379/88.05, 88.06; 341/28; 382/185; 345/333, 141, 150, 145, 171, 157

[56] References Cited

U.S. PATENT DOCUMENTS

| | | | |
|---|---|---|---|
| 4,124,843 | 11/1978 | Bramson et al. | 345/171 |
| 4,185,282 | 1/1980 | Pick | 345/171 |
| 5,070,456 | 12/1991 | Garneau et al. | 704/8 |
| 5,127,748 | 7/1992 | Okimoto et al. | 400/70 |
| 5,408,603 | 4/1995 | Van de Lavoir et al. | 345/349 |
| 5,526,259 | 6/1996 | Kaji | 704/3 |
| 5,526,268 | 6/1996 | Tkacs et al. | 704/8 |
| 5,581,670 | 12/1996 | Bier et al. | 345/326 |
| 5,623,682 | 4/1997 | Fukunaga | 707/536 |
| 5,635,958 | 6/1997 | Murai et al. | 345/168 |
| 5,721,938 | 2/1998 | Stuckey | 704/4 |
| 5,786,809 | 7/1998 | Ryzhov et al. | 345/168 |
| 5,881,168 | 3/1999 | Takaoka et al. | 382/180 |

FOREIGN PATENT DOCUMENTS 360048532A 3/1985 Japan .
408161320A 6/1996 Japan .

*Primary Examiner*—Joseph Thomas
*Attorney, Agent, or Firm*—Robert E. Bushnell, Esq.

[57] ABSTRACT

A method for monitoring the language used by an operating system to communicate with a user via a display device. Two compatible types of operating systems are those that use a WINDOWS 3.1 operating system format and a WINDOWS 95 operating system format. The cursor in the character input area of the display device has a different color depending on the language being used by the operating system. This greatly enhances efficiency when alternately typing information in multiple languages. The method provides a small window that indicates which language is currently being used by the operating system. Contained in this window is a language conversion button that has a language indicating symbol positioned on it. The color of the symbol matches the color of the cursor. When the button is selected using a mouse or a shortcut key, the operating system switches the linguistic characters generated by signals from the keyboard to that of a different language. Thus, a user does not have to check the language interface window to determine which linguistic character generating mode the operating system is in. This greatly reduces mistakes and increases the efficiency of document production.

26 Claims, 3 Drawing Sheets

METHOD FOR MONITORING THE LANGUAGE USED FOR CHARACTER GENERATION BY AN OPERATING SYSTEM

CLAIM OF PRIORITY

This application makes reference to, incorporates the same herein, and claims all rights accruing thereto under 35 U.S.C. §119 through my patent application entitled A Method of Indicating Multilingual Status earlier filed in the Korean Industrial Property Office on Nov. 13, 1996 and there duly assigned Ser. No. 1996/53774.

BACKGROUND OF THE INVENTION

1. Field of the Invention

The present invention relates to operating systems with multi-lingual user interfaces and, more specifically, to a method for monitoring the language used by an operating system to communicate with a user through a display device.

2. Background Art

The use of operating systems capable of interfacing with users in multiple languages increases user efficiency for those engaged in multi-lingual document production and increases the usefulness of operating systems. Some examples of the multi-lingual computer interface art are: U.S. Pat. No. 5,127,748 to Okimoto entitled Documentation System Having Multilingual Function, U.S. Pat. No. 4,124,843 to Bramson entitled Multi-Lingual Input Keyboard and Displal, U.S. Pat. No. 5,070,456 to Garneau entitled Method for Facilitating the sorting of National Language Keys in a Data Processing System, U.S. Pat. No. 4,185,282 to Pick entitled Displayed Keyboard Indicia, U.S. Pat. No. 5,623,682 to Fukunaga entitled Apparatus for Processing Documentary Information, and U.S. Pat. No. 5,408,603 to Van de Lavoir entitled Global Process Control Information System an Method.

Two examples of multi-lingual operating systems are the Microsoft (r) WINDOWS (r) 3.1 and WINDOWS (r) 95 operating systems. Both include a language input control program in the foreign language versions oftheir operating systems. The language input control program is called the "Input Method Editor" (IME). IME is installed along with a foreign language version of an operating system to set the foreign language as the default language. IME also adjusts the properties of the keyboard to allow the generation of the appropriate characters when the appropriate key is pressed.

For example, the Korean version of WINDOWS (r) 95 operating system uses a bilingual input system supported by IME. This version uses Hangul, the Korean language, as the default language while allowing another language, such as English, to be selected. Once the desired language is selected using the control panel, conversion between languages can be performed by pressing a specific key combination, such as ALT+SHIFT. Furthermore, a button can be displayed on the task bar that represents the currently selected language.

The Korean language button is displayed along with another button icon that indicates the current language being used by the operating system to communicate with a user. The Korean version of the WINDOWS 3.1 and WINDOWS 95 operating systems also include half or full width characters along with the ability to use either Korean or English characters. In addition, the language interface window for the Korean versions can be displayed "on top" of existing windows to maintain visibility even when the task bar is hidden from view. The window is designed to have smaller size than the WINDOWS 95 operating system screen and it is located on the lower right hand side of the screen. The Korean language button and other alternative language buttons are located inside the language interface window. The user can then input characters corresponding to the language selected into the main screen of the WINDOWS 95 operating system. The cursor indicates the insertion point for the characters selected by a user.

The Korean language interface window contains three buttons. The left button represents the current language input mode. By pressing this icon or button a user can toggle back and forth from Korean to English.

I have observed that using the Language interface window as a reminder of which input mode the operating system is using is sometimes difficult. While the language interface window can be referred to when a user forgets which mode the operating system is in, problems arise when one is alternately inputting both Korean and English words. When the user accidentally enters input corresponding to a language that the operating system is not currently using, an error results. To correct the mistake, a user must delete the incorrectly printed characters and re-enter the characters after setting the operating system to translate the keyboard signals into characters of the correct language. This process of correcting erroneously entered characters is tedious and time-consuming I have further observed that one tends to watch the cursor while inputting data rather than look at language input window. This lack of careful attention to the language input window while alternately entering characters from different languages often results in increasing the number of mistakes generated. I expect that a method that allows a user to visually confirm the language input mode of the operating system without needing to look at the language input mode window will decrease the number of mistakes, increase document production efficiency, preventing the interruption of concentration, and increasing typing speed.

SUMMARY OF THE INVENTION

Accordingly, it is an object of the present invention to provide an improved method for monitoring the language used by an operating system to communicate with a user.

It is another object to provide a method of monitoring the language used by an operating system that increases one's ability to concentrate without disturbance.

It is still another object to provide a method of monitoring the language used by an operating system that reduces the numbers of mistakes made while alternately entering characters from multiple languages.

It is yet another object to provide a method of monitoring the language used by an operating system that increases a user's efficiency of document production.

It is still yet another object to provide a method of monitoring the language used by an operating system that increases typing speed.

To accomplish these and other objects, a method of monitoring the language used by an operating system to communicate with a user via a display device is used that first determines whether the operating system is ready to receive signals from a keyboard representative of linguistic characters. Then, the operating system reads language data for the currently selected language used by the operating system's input control program. This data is matched with the variety of signals that can be sent from the keyboard, thus enabling a user to generate the desired characters by manipulating the keyboard. The operating system displays a cursor that has a color corresponding to the current interface language used by the operating system. When the operating system detects signals from the keyboard, it first checks to determine whether the signals represent a language conversion command. If the operating system determines that the language conversion command has been given, the operating system returns to the step of reading language data, except that the operatin, system now reads data for the new language and also changes the color of the cursor to the color indicative of the second language. Lastly, if the signals received from the keyboard correspond to linguistic characters, the operating system displays the linguistic characters on a display device and moves the cursor to the next character input position.

The cursor colors are selected in the keyboard settings program and can be changed by moving the mouse cursor and clicking on the language conversion button contained inside the language interface window. The cursor color matches the color of the language interface window, and the color of the language indication symbol on the language conversion button. Since the cursor has the same color as the language indication symbol, it is possible to monitor the language input mode of the operating system without having to shift one's vision to look at the language input mode window.

BRIEF DESCRIPTION OF THE DRAWINGS

A more complete appreciation of this invention, and many of the attendant advantages thereof will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
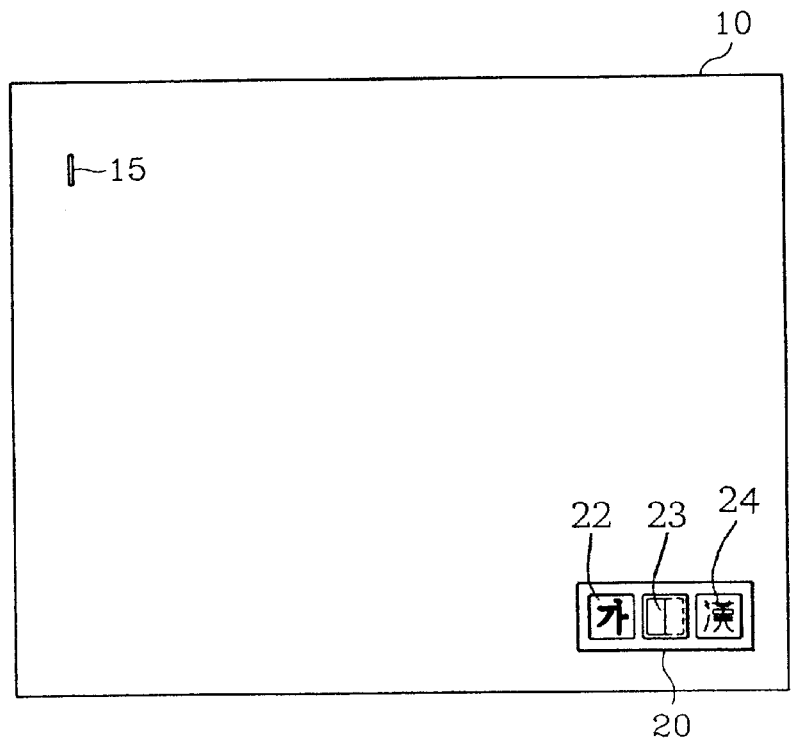
FIG. 1 is a diagram of a monitor screen displaying the language interface window in the Korean version of the WINDOWS (r) 95 operating system.

Turning now to the drawings, FIG. 1 illustrates language interface window 20 that is smaller than main window 10 and is located in the lower right hand corner of the main window. Window 10 can be filled with linguistic characters generated in response to signals sent from a keyboard due to the manipulations of a user. Cursor 15 shows the insertion point of newly generated linguistic characters. While this disclosure refers, for simplicity, to an operating system convertible between Korean and English, this invention will be usable with any choice or number of languages. In fact, the method disclosed becomes even more useful when a multiplicity of languages are being used.

Figure 2:
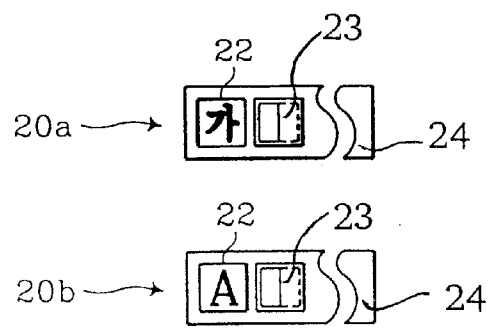
FIG. 2 is an enlarged diagram of the language interface window for the Korean version of an operating system with buttons indicating a Korean language input mode and an English language input mode.

FIG. 2 shows the Korean version of language interface window 20. Interface window 20 contains three buttons. First button 22 is the language conversion button. When a user clicks on button 22 using a mouse, the operating system converts between Korean and English or vice versa. Language conversion button 22 can also be used to monitor the current language being used by the operating system. The button has a language indicating symbol on it that always shows the current language being used by the operating system. Language interface window 20a shows a language conversion button interface with a Korean character indicating that the operating system is currently using Hangul as its user interface language. Language interface window 20b shows a language conversion button with an English character indicating that the operating system is currently using English as its user interface language. The language interface window may also contain buttons that control the width of letters 23 or the inputting of Chinese characters 24. Language interface window 20 is referred to when a user forgets the current interface language or when the operating system changes the task to confirm the current language interface.

Figure 3:
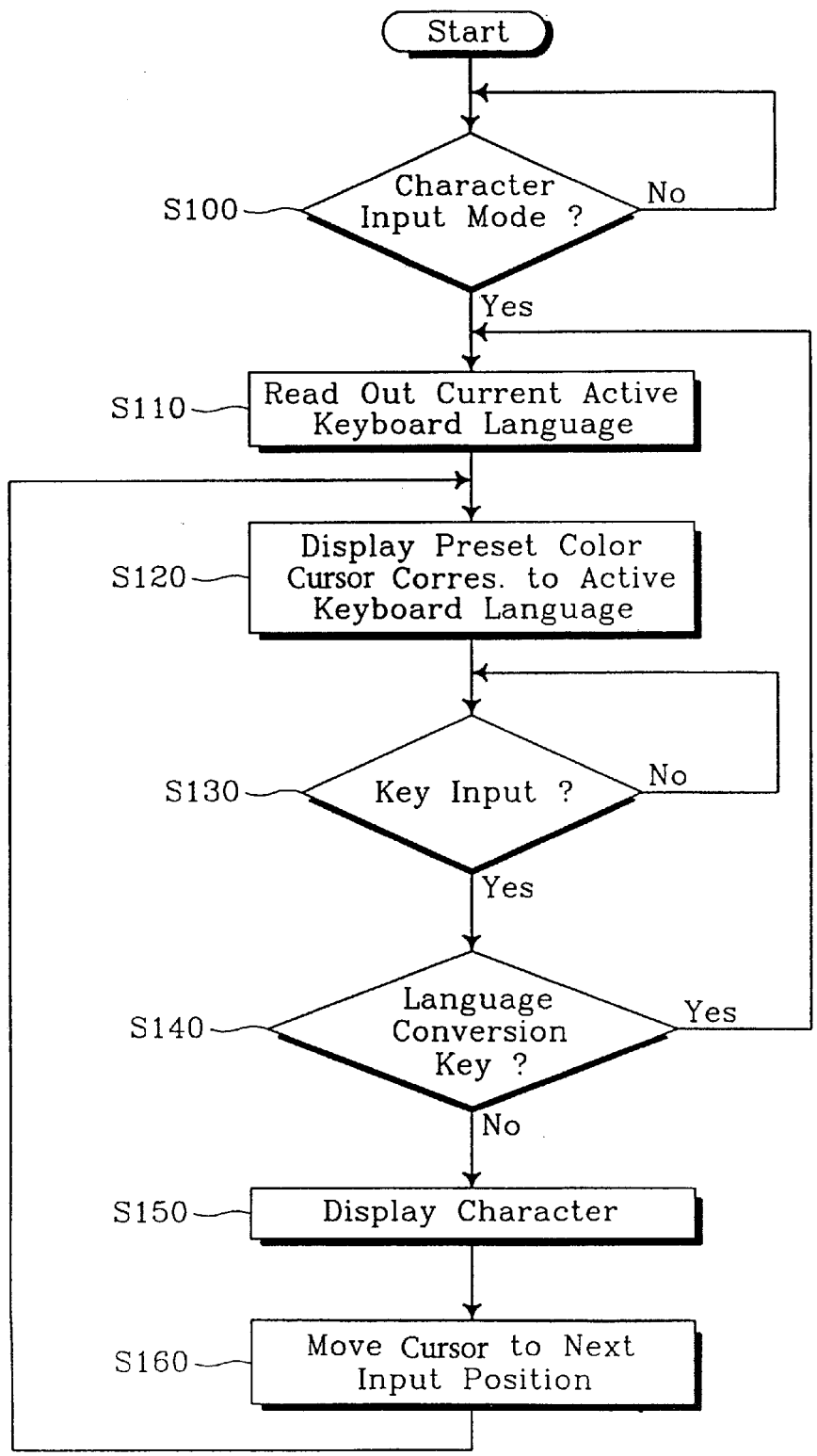
FIG. 3 is a flow chart illustrating a method in accordance with the principles of the present invention for monitoring the language used by an operating system to communicate with a user via a display device.

FIG. 3 shows a method for monitoring the language used by an operating system to communicate with a user via a display device in accordance with the principles of the present invention. Initially, during step S100, the computer is turned on and an operating system, such as the Korean version of the WINDOWS (r) 95 operating system, is started. The operating system detennines whether the system is ready to receive signals representing linguistic characters from a keyboard, light-pen, touch sensitive kiosk, voice recognition device, etc. If the operating system is ready to receive input signals, then the operating system proceeds to step S110 and reads language data from the Input Method Editor for the current interface language and matches the data with the various signals it can receive. Thus, a user is able to generate characters by manipulating an input device and sending signals to the operating system. Then, during step S120, the operating system displays a cursor having a coloi or a shape that corresponds to the current interface language. By adding a cursor color display program, the user will be able to enter the control panel and adjust the colors used to indicate various languages by entering the keyboard settings function.

During step S130, the operating system determines whether a signal has been generated by the depression of a key on a keyboard or another analogous input device. Once a signal is received indicating that a key has been activated, the operating system proceeds with step S140 to determine whether the language conversion command has been given. If the language conversion command has been given, the operating system returns to step S110 to read the language data for the newly selected language and matches it to the possible signals that the operating system can receive, thus allowing a user to generate linguistic characters in the new language by manipulating the keyboard. Then, during step S120, the operating system changes the current color or current shape of the cursor to that color or that shape used to indicate the use of the new language by the operating system. As such, each cursor color corresponds to a set of language data stored in the IME. These data sets are used to translate signals received from the keyboard into appropriate linguistic characters, thus allowing a user to generate documents utilizing text from many languages with increased efficiency. The selection of colors that are indicative of particular languages can be changed by a user using a keyboard settings program that can be added to the control panel. The color of the cursor can also be changed by clicking on language conversion button 22. The language indication symbol on button 22 has the same color as cursor 15.

Each time the language used by the operating system is converted from a first language to a second language and vice versa, the cursor in the linguistic character input area toggles between the predetermined specific colors representing the two languages, such as black and red. If the signals received from the keyboard are not the language conversion command, then the operating system proceeds to steps S150 and generates the appropriate character. Then, during step S160, the operating system moves the cursor to the next character input position. Then, the operating system returns to step S120 and continues to display a cursor of the appropriate color for the language being used by the operating system to communicate with the user through the display device.

Figure 4:
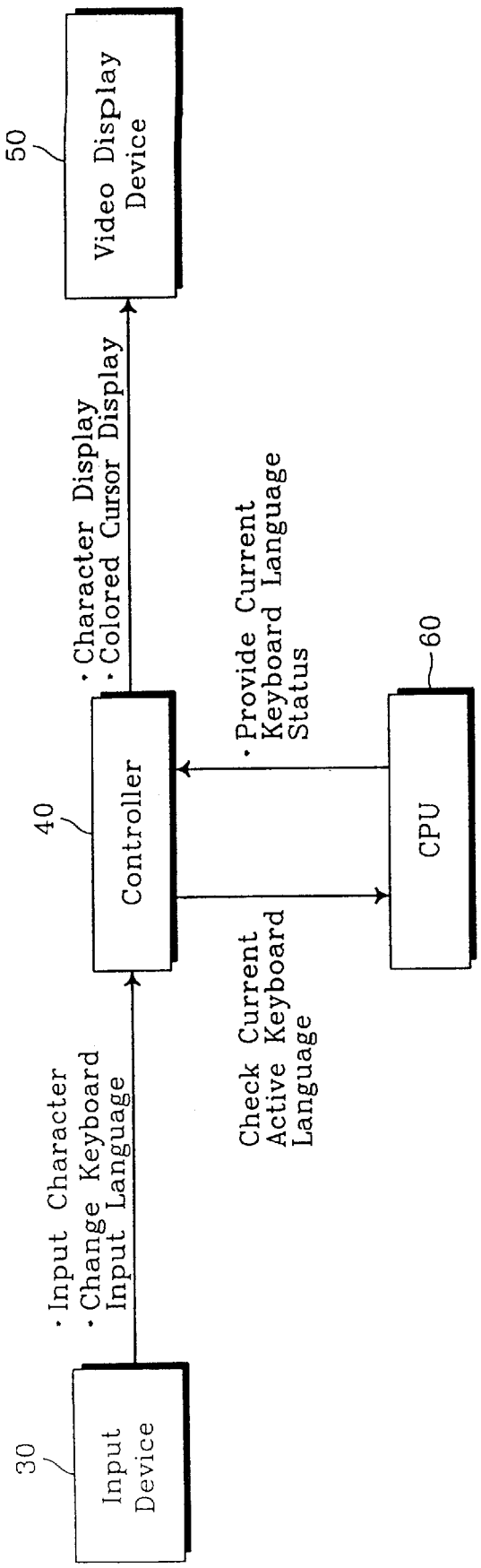
FIG. 4 is a block diagram of a computer system using the method of FIG. 3.

One computer system suitable for carrying out the present invention is shown in FIG. 4. The computer system may be constructed with an input device 30, a controller 40, a CPU 60, and a video display device 50. Input device 30 can be either a mouse, a light pen, a keyboard, a voice recognition system, or any combination. Controller 40 requests the current language being used by the operating system and receives the information from CPU 60. The controller 40 also retrieves the color information from the CPU 60 and provides the information to the display device. The controller 40 can be eliminated from the computer system with CPU 60 performing the tasks of both.

This invention provides an improved method to monitor the language being used by an operating system to communicate with a user. By using color coded cursors that indicate the current language being, used by the operating system, the number of mistakes made are reduced because of the elimination of a need to check the language interface window while alternately typing text in multiple languages. Due to the difficulty in avoiding mistakes when frequently changing the Ianguage being entered into the computer, this invention becomes even more useful when entering, characters from a multiplicity of languages. This increases both typing speed and the efficiency of document production. By allowing a user to select the colors that represent a language, a user can pick the colors that make the most intuitive sense and thereby enhance the effectiveness of this method.

Although this prefelTed embodiment of the present invention has been disclosed for illustrative purposes, those skilled in the art will appreciate that various modifications, additions and substitutions are possible, without departing from the scope and spirit of the invention as disclosed in the accompanying claims. It is also possible that other benefits or uses of the currently disclosed invention will become apparent over time.

What is claimed is:

1. A process for indicating a multilingual input mode for an operating system, comprising the steps of:

determining whether said operating system is in a character input mode;

if the operating system is in the character input mode, then:
   reading a plurality of data representative of a current active keyboard language from a specific language input control program of said operating system;
   displaying a colored cursor corresponding to a current active keyboard language at a character input position on a display device;
   determining whether a key input is entered and whether said key input is a language conversion command; and
   if said key input is said language conversion command, then:
      returning to the step of reading a plurality of data to read a plurality of changed keyboard language data and to display a different colored cursor corresponding to another keyboard language set in said operating system.

2. The process of claim 1, further comprising the steps of:
if the key input is not the language conversion command, then displaying a character; and
moving a colored cursor caret to a next character input position.

3. The process of claim 1, wherein colors of said cursor can be selected in a keyboard language setting program.

4. The process of claim 1, wherein a color of said cursor can be changed by clicking a language conversion button contained in an input method editor window appearing on said display device, said language conversion button having a language indication symbol colored identically to said cursor.

5. The process of claim 1, said operating system being one of a WINDOWS 3.1 operating system and a WINDOWS 95 operating system and their derivatives.

6. The process of claim 1, said operating system being capable of using both a color of a cursor and a shape of said cursor to signify a language currently used by said operating system to match a plurality of symbols with a plurality of signals sent by an input device.

7. A process for monitoring a language used for character generation by an operating system, comprising the steps of:

determining whether said operating system is ready to receive a plurality of signals representative of linguistic characters from an input device, said operating system running on a computer system comprising a central processing unit, said input device and a display device;

reading a first plurality of data corresponding to a first language currently used by said operating system to communicate with a user via said display device, said first plurality of data being matched with a plurality of signals sendable by said input device thereby allowing said user to generate a plurality of symbols by manipulating said input device;

displaying a cursor on said display device, said cursor having a color signifying that said first language is currently being used by said operating system to match said symbols with said signals sent by said input device;

receiving said signals from said input device;

determining whether said signals received from said input device include a command to change from using said first language to using a second language to match said symbols with said signals sent by said input device;

if said signals include said command to change from said first language to said second language:
   reading a second plurality of data corresponding to said second language;
   changing said symbols generated in response to said signals to correlate with said second language thereby allowing said user to generate symbols representative of said second language by manipulating said input device;
   changing said color of said cursor on said display device to signify that said second language is currently being used to generate said symbols in response to manipulation of said input device; and
   returning to said step of receiving said signals from said input device; and if said signals do not include a command to change from said first language to said second language:

displaying said symbols of said first language that match said signals sent from said input device on said display device at a position identified by said cursor;

moving said cursor to a next symbol insertion position; and returning to said step of displaying a cursor on said display device, said cursor having a color signifying said first language.

8. The process of claim 7, said operating system having a plurality of data sets corresponding to a plurality of languages usable for matching said signals with said symbols.

9. The process of claim 7, said color of said cursor being selectable by said user.

10. The process of claim 7, said operating system being one of a WINDOWS 3.1 operating system and a WINDOWS 95 operating system and their derivatives.

11. The process of claim 7, said operating system displaying a window on said display device, said window containing a plurality of buttons.

12. The process of claim 11, said buttons comprising a language conversion button, a linguistic character width button, and a Chinese character input button, each of said buttons being clickable using a mouse, said language conversion button displaying a language currently used by said operating system and converting said language to another when clicked on by said mouse.

13. The process of claim 12, said language conversion button having a language indicating symbol colored identically to said cursor.

14. The process of claim 7, said input device being any one of a keyboard, a light-pen, a touch sensitive kiosk, a mouse, a voice recognition system, and a combination thereof.

15. The process of claim 7, said operating system changing non-user entered symbols used to format a user interface for said operating system on said display device.

16. The process of claim 7, said operating system being capable of using both said color of said cursor and a shape of said cursor to signify a language currently used by said operating system to match said symbols with said signals sent by said input device.

17. A process for identifying a type of symbols generated by an operating system, comprising the steps of:

matching a first set of data corresponding to a first language currently used by said operating system to generate a plurality of symbols with a plurality of signals sendable by an input device, said matching allowing a user to generate a plurality of symbols by manipulating an input device, said operating system running on a computer system comprising a central processing unit, said input device and a display device;

displaying a cursor on said display device, said cursor having a color signifying that said first language is currently being used by said operating system to match said symbols with said signals sent by said input device;

receiving said signals from said input device;

deteimining whether said signals received from said input device include a command to change from using said first language to using a second language to match said symbols with said signals sent by said input device;

if said signals include said command to change from said first language to said second language:

matching a second set of data corresponding to said second language to said signals sendable by said input device;

changing said color of said cursor on said display device to signify that said second language is currently being used to generate said symbols in response to manipulation of said input device; and returning to said step of receiving said signals from said input device; and if said signals do not include a command to change from said first language to said second language:

displaying said symbols of said first language corresponding to said signals sent from said input device on said display device;

moving said cursor; and returning to said step of displaying a cursor on said display device, said cursor having a color signifying said first language.

18. The process of claim 17, said operating system having a plurality of sets of data corresponding to a plurality of languages usable for matching said signals sendable by said input device with said symbols.

19. The process of claim 17, said color of said cursor being selectable by said user.

20. The process of claim 17, said operating system being one of a WINDOWS 3.1 operating system and a WINDOWS 95 operating system and their derivatives.

21. The process of claim 17, said operating system displaying a window on said display device, said window containing a plurality of buttons.

22. The process of claim 21, said buttons comprising a language conversion button, a linguistic character width button, and a Chinese character input button, each of said buttons being clickable using a mouse, said language conversion button displaying a language currently used by said operating system and converting said language to another when clicked on by said mouse.

23. The process of claim 22, said language conversion button having a language indicating symbol colored identically to said cursor.

24. The process of claim 17, said operating system being capable of using both said color of said cursor and a shape of said cursor to signify a language currently used by said operating system to match said symbols with said signals sent by said input device.

25. The process of claim 17, said input device being any one of a keyboard, a light-pen, a touch sensitive kiosk, a mouse, a voice recognition system, and a combination thereof.

26. The process of claim 17, said operating system changing non-user entered symbols used to format a user interface for said operating system on said display device.

* * * * *